United States Patent [19]
Schlanger

[11] Patent Number: 5,104,199
[45] Date of Patent: Apr. 14, 1992

[54] VEHICLE WHEEL

[76] Inventor: Raphael Schlanger, 18 Elton Ct., Norwalk, Conn. 06851

[21] Appl. No.: 603,556
[22] Filed: Oct. 26, 1990
[51] Int. Cl.⁵ .............................................. B60B 1/00
[52] U.S. Cl. ................................ 301/63 DD; 301/95
[58] Field of Search .......... 301/63 DD, 63 DS, 64 R, 301/66, 95, 96, 97, 98, 105 B, 63 PW

[56] References Cited
U.S. PATENT DOCUMENTS

| | | | |
|---|---|---|---|
| 2,297,960 | 10/1942 | Hood | 301/105 B |
| 2,710,230 | 6/1955 | Tea, Jr. | 301/64 R |
| 3,862,779 | 1/1975 | Jayne | 301/63 DD |
| 4,358,162 | 11/1982 | Schneider et al. | 301/63 PW X |
| 4,844,552 | 7/1989 | Tsygankov et al. | 301/63 PW X |
| 4,919,490 | 4/1990 | Hopkins et al. | 301/63 PW |

FOREIGN PATENT DOCUMENTS 885675  12/1961  United Kingdom .......... 301/63 PW

Primary Examiner—Russell D. Stormer
Attorney, Agent, or Firm—Bachman & LaPointe

[57] ABSTRACT

The wheel includes an annular rim, a central hub, a plurality of spoke portions running between the rim and hub, and two wheel portions integrally joined to each other and including the spoke portions.

17 Claims, 4 Drawing Sheets

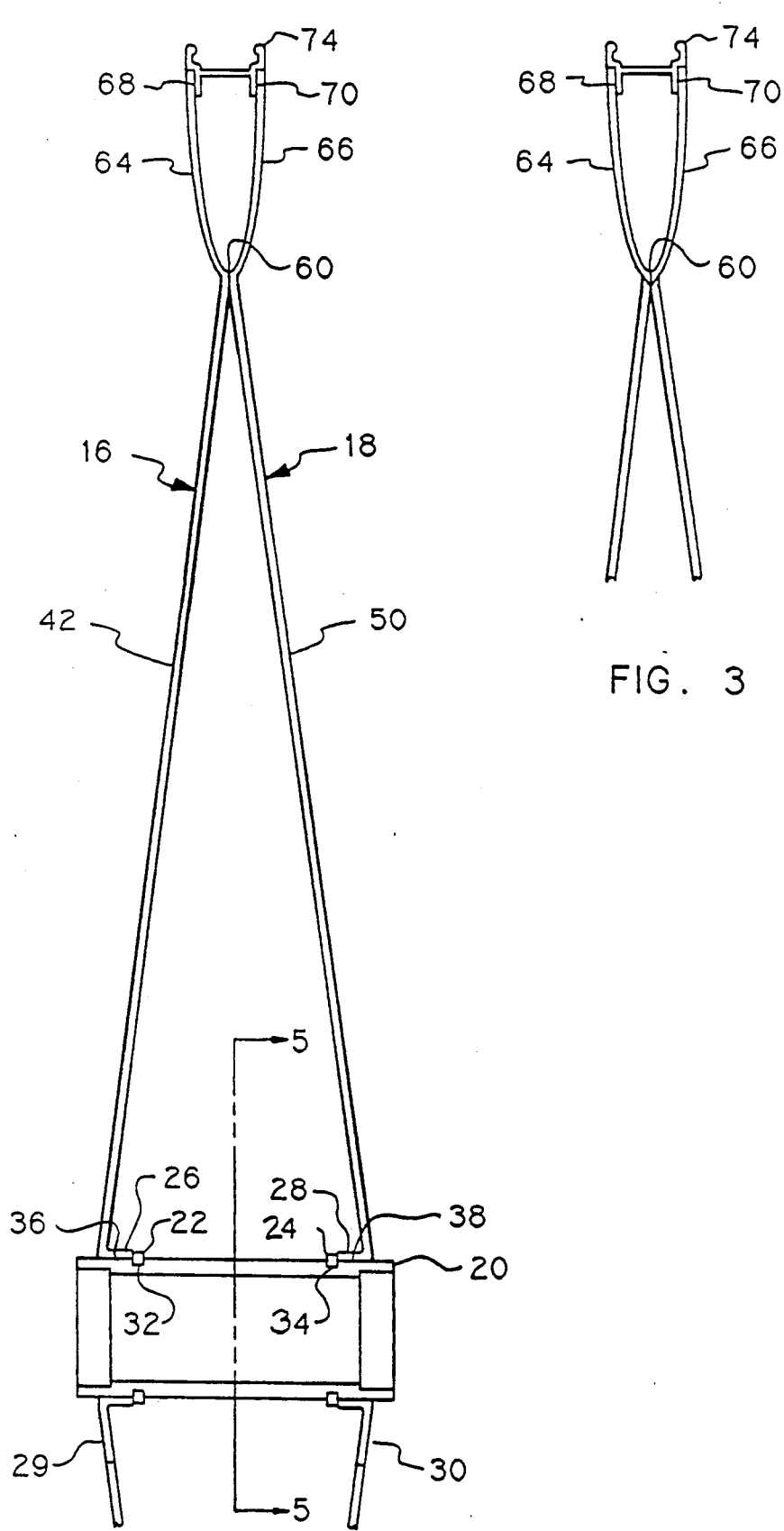

VEHICLE WHEEL

BACKGROUND OF THE INVENTION

This invention relates to a vehicle wheel and especially to a bicycle wheel having a rim section, a plurality of spoke sections and a hub section.

In recent years, participation in competitive cycling has increased dramatically and has created a demand for greater performance characteristics from cycling equipment. It is generally acknowledged that reduced aerodynamic drag, lower weight, increased rider comfort, low maintenance and reduced cost are goals to consider when attempting to enhance the performance of bicycle equipment.

Conventional bicycle wheels are typically constructed using twenty eight or more individual wire spokes. Each of these spokes must continually break the wind as the wheel rotates, creating aerodynamic drag. An attempt to overcome some of this aerodynamic drag has been to construct the bicycle wheel as a solid disc. Although these disc wheels reduce the aerodynamic drag, rider stability and safety are significantly compromised. If prevailing wind patterns have any component perpendicular to the riders direction of travel, as is most often the case, the disc wheel acts as a sail resulting in a potentially dangerous instability problem. More recently, several manufacturers have introduced one-piece spoked wheels constructed from fiber reinforced plastic. These wheels attempt to reduce aerodynamic drag by reducing the number of individual spokes to three or five. However, in an effort to maintain lateral rigidity, these wheels utilize additional material in construction and weigh significantly more than a conventional wheel of comparable size. Additionally, the manufacturing processes required to produce these plastic spoke wheels are quite complex. Fabrication involves careful wrapping of fiber reinforcement cloth around a foam armature or plastic bladder, placing this assembly within a mold, together with uncured resin, and applying heat and pressure to the mold to cure the resin. This process is very labor intensive and requires highly skilled production personnel. Also, the disc type wheels and the plastic spoke wheels have been described as lacking the shock absorption and resiliency of conventional wheels, resulting in a more uncomfortable ride. These disc type wheels and plastic spoke wheels act to support a load on the axle through compression of the spoke or disc sector between the hub and the ground resulting in excessive rigidity. Conventional wheels support this load through tension of the spokes above the hub. It is this tension loading which gives the conventional wheel its resilient feel.

Accordingly, it is an object and advantage of the present invention to provide a bicycle wheel that can be manufactured at a reasonable cost through a configuration which lends itself to simple manufacturing processes, fewer component parts and minimal raw material.

It is a further object and advantage of the present invention to provide a bicycle wheel that has very low aerodynamic drag by limiting the number of individual spokes and minimizing the spoke frontal area in the direction of rotation.

It is a still further object and advantage of the present invention to provide a bicycle wheel that is stable and easy to control in all normal wind conditions.

A still further object and advantage of the present invention is to provide a bicycle wheel that is of particularly light weight by utilizing lightweight, high strength materials and by reducing the volume of material required to produce a structurally sound product.

An additional object and advantage of the present invention is to provide a bicycle wheel that does not require periodic rim alignment adjustments.

A further object and advantage of the present invention is to provide a bicycle wheel which affords the cyclist a comfortable resilient ride.

Further objects and advantages will become apparent from consideration of the ensuing description and drawings.

SUMMARY OF THE INVENTION

In accordance with the present invention, the foregoing objects and advantages are readily obtained. The spoked wheel of the present invention comprises: an annular rim; a central hub; a plurality of spoke portions running between the rim and hub; and wherein said wheel comprises at least two wheel portions integrally joined to each other and including said spoke portions, means adjacent said hub for retaining the hub between the wheel portions, and means adjacent the annular rim for retaining the annular rim adjacent the wheel portions. The wheel portions are generally symmetrically opposed to each other and generally include two wheel portions each having an inside portion connected to the hub and an outside portion connected to the rim.

Further features and advantages will appear hereinbelow.

BRIEF DESCRIPTION OF THE DRAWINGS

The present invention will be more readily understandable from the accompanying drawings.

FIG. 2 is a cross-sectional view taken along line 2—2 of FIG. 1;

FIG. 3 is a cross-sectional view taken along line 3—3 of FIG. 1;

DETAILED DESCRIPTION

Figure 1:
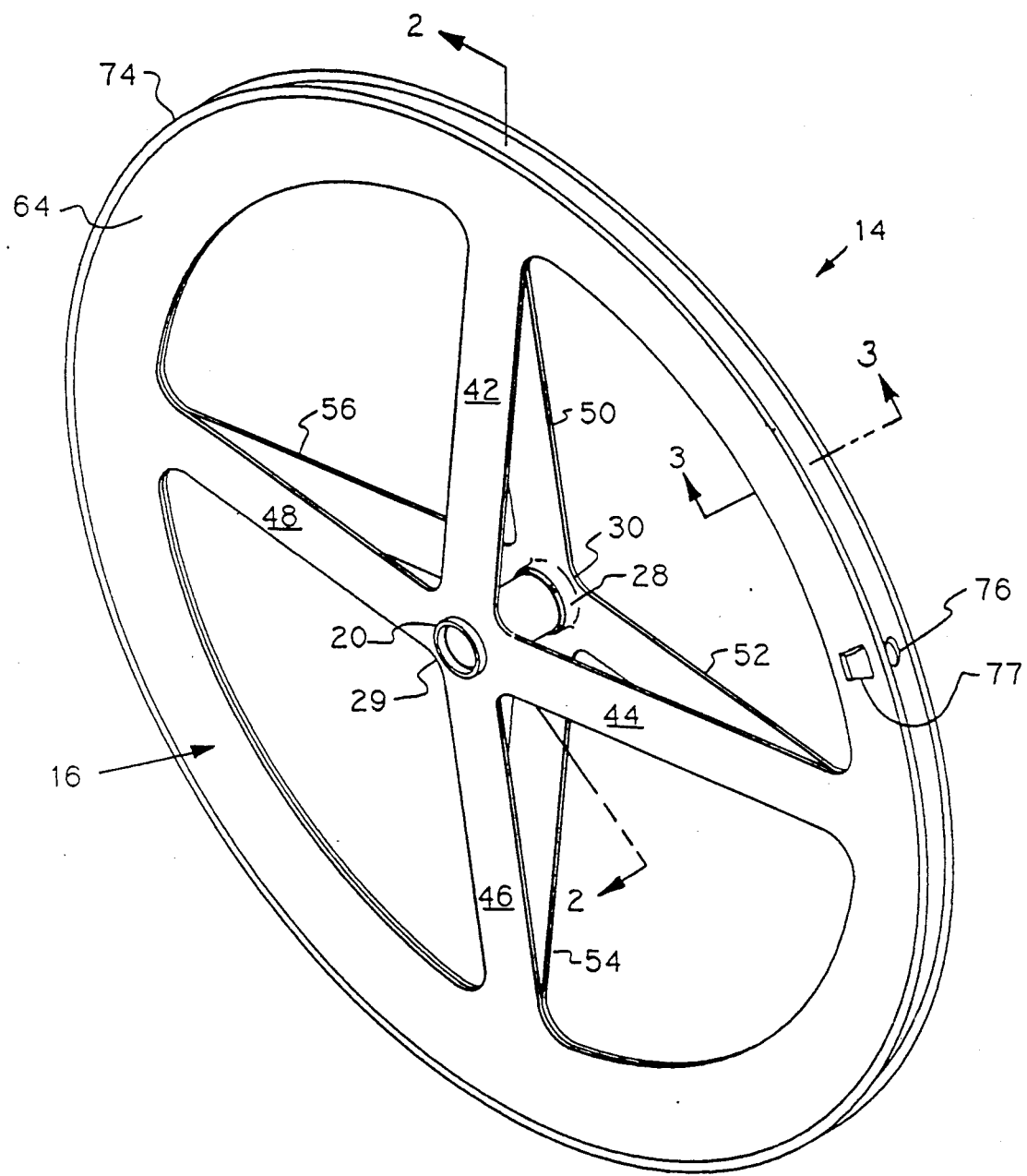
FIG. 1 is a perspective view of the preferred embodiment of the wheel construction.

Referring to the drawings, the preferred embodiment is illustrated in FIGS. 1-5 of the drawings. Referring to these drawings and first to FIGS. 1 and 2, wheel 14 is generally composed of four major components. The annular rim or rim hoop 74 is sandwiched between the left wheel half 16 and the right wheel half 18 in a symmetrically opposed manner. The central hub or hub shell wheel 20 is of a generally cylindrical configuration and is connected around its perimeter, at one end to the left wheel half 16 and at the other end to the right wheel half 18.

In a more specific description of the wheel 14 and referring to FIGS. 1-3, the left wheel half is preferably molded in one contiguous piece and includes a centrally located inwardly facing, flange-like left side hub ring 26 which is connected to the left side centrally located spoke web 29. The spoke web 29 is the central or inside terminus of the left side spokes 42, 44, 46, 48 which extend radially to connect, at their outer or outside portions, to the left side circular member 64 which is the outer terminus of the spokes. The right wheel half 18 is molded similarly to integrate the right side hub ring 28, the right side spoke web 30, the right side spokes 50, 52, 54, 56, and the right side circular member 66 all of which are interconnected in the same manner as their associated portions of the left wheel half 16.

Figure 4:
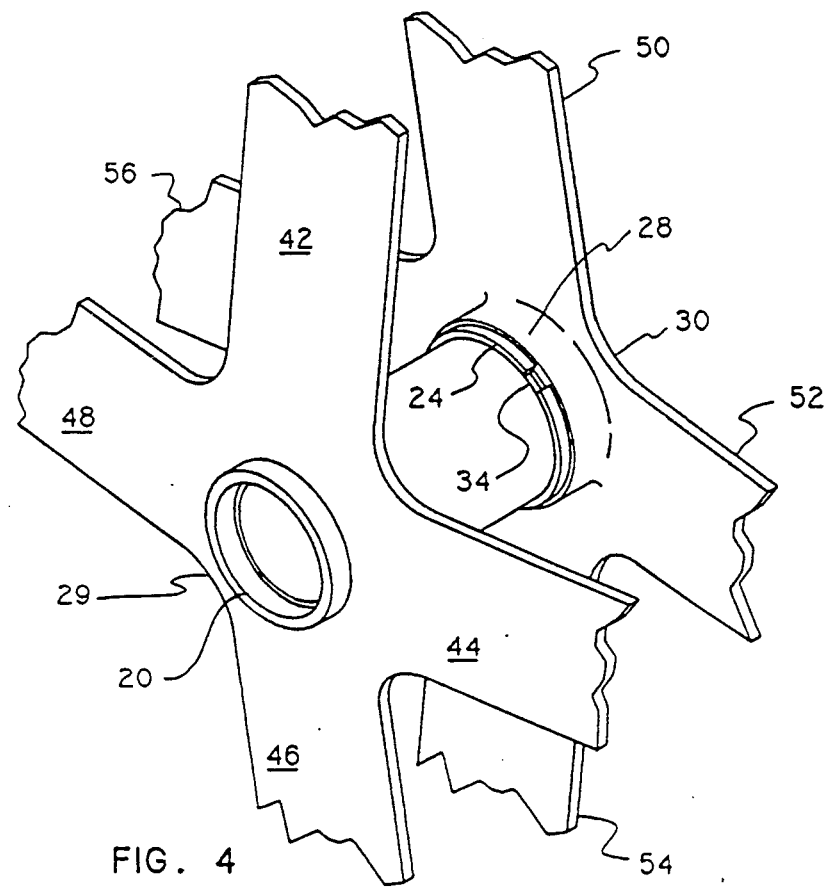
FIG. 4 is a perspective view detail taken from FIG. 1 showing the center region of the wheel.
Figure 5:
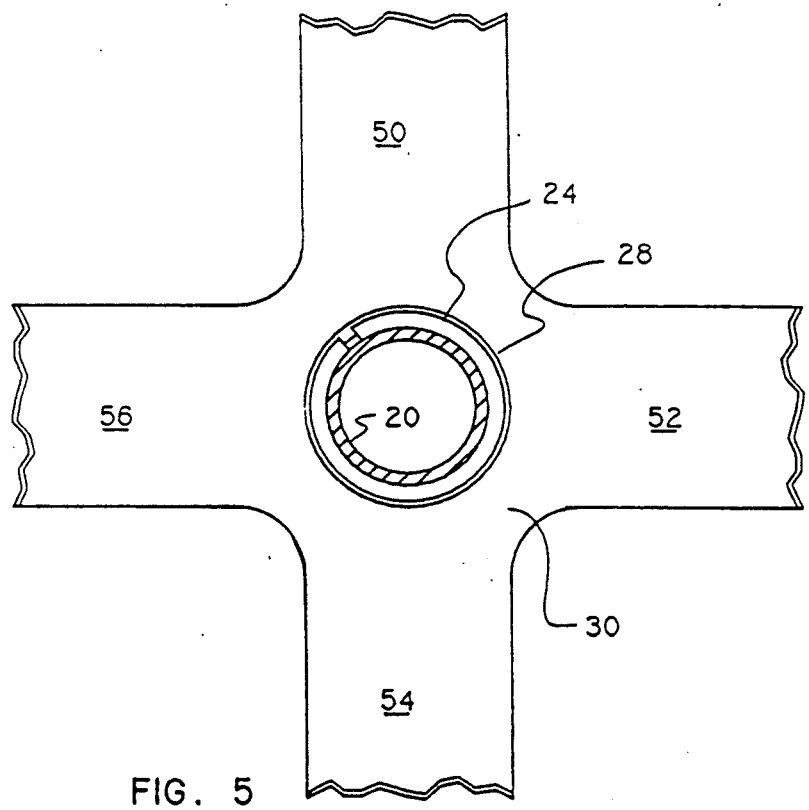
FIG. 5 is a cross-sectional view taken along line 5—5 of FIG. 2.

Referring to FIGS. 2, 4 and 5, the hub shell 20, which is generally cylindrical in shape, incorporates a left side retainer groove 32 cut into its perimeter and a right side retainer groove 34 cut into its perimeter. The grooves 32 and 34 are separated axially on their respective sides of the hub shell 20. The left side retainer groove 32 acts to engage with the left side split ring retainer 22 and the right side retainer groove 34 acts to engage with the right side split ring retainer 24. The left side retainer 22 serves to axially locate and fixture the left side hub ring 26 as the right side retainer 24 serves to locate and fixture the right side hub ring 28. The left side hub ring 26 and hub shell 20 are connected along the left side hub ring interface 36. Similarly, the right side hub ring 28 is connected to the hub shell 20 along the right side hub ring interface 38.

Referring to FIGS. 1, 2 and 3, the inner perimeter of the left side circular member 64 is fastened to the inner perimeter of the right side circular member 66 along the base portion of the circular member interface 60. The left side circular member 64 and the right side circular member 66 flare in a generally divergent outward direction to connect with their respective sides of the rim hoop 74. The left side circular member 64 is fastened to the rim hoop 74 at the left side rim hoop interface 68. Similarly, the right side circular member 66 is fastened to the rim hoop 74 along the right side rim hoop interface 70. An enclosed hollow section is then created by the left side circular member 64, the right side circular member 66 and capped by the rim hoop 74 as illustrated in FIGS. 2 and 3. A hole 76 (see FIG. 1) through the rim hoop 74 is located at a convenient location to accept a tire valve (not shown). Additionally, a small opening 77 is formed in the left side circular member 64 and/or the right side circular member 66 in a location aligned with the hole 76 to provide access to the tire valve (not shown).

A left side wheel half 16 as shown in the preferred embodiment of FIG. 1 is preferably molded from a high strength fiber reinforced plastic by the following method. Fabric woven from one or more types of high strength fiber and preimpregnated with an uncured resin matrix is cut to a predetermined outline which basically follows the outline of the left wheel half 16. Orientation of the fibers in the fabric weave with respect to the part is especially important in this application as it is for most fiber reinforced parts. The desired orientation is such that unbroken fibers within the weave run longitudinally along each spoke 42, 44, 46, 48. This cutout piece along with additional piece(s) are placed in the lower half of a two part mold. An upper mold half is placed over the lower mold half to sandwich the fibers in between. Finally, the mold halves are pressed together and heated to cure the resin. A molded left wheel half 16 is then removed from the mold and deflashed.

It is preferred that the right wheel half 18 is identical to the left wheel half 16 and would be formed in the same mold. The two wheel halves 16 and 18 would then be assembled together in a back-to-back fashion as illustrated in FIG. 2.

It should be noted that, while high strength fiber reinforced plastic is a preferred material in this application, the configuration of the wheel halves 16 and/or 18 lend themselves to fabrication from many other materials. For example, these parts could be easily fabricated from metal sheet using conventional blanking and forming techniques. Additionally, the preferred embodiment describes the wheel halves 16 and 18 as being formed in one contiguous piece. Alternative embodiments could utilize wheel halves 16 and/or 18 that are constructed from multiple component parts and fabricated from a variety of materials.

FIG. 1 illustrates a wheel 14 that is constructed from a left wheel half 16 and a right wheel half 18, each employing four spoke portions 42, 44, 46, 48 and 50, 52, 54, 56 respectively. It should also be noted that alternative embodiments could employ three to five or more spoke portions per wheel half 16 or 18. Additionally, FIGS. 1 and 2 illustrate the spoke portions 42, 44, 46, 88 of the left wheel half 16 as being oriented directly opposite the associated spoke portions 50, 52, 54, 56 of the right wheel half. While this configuration minimizes the stress on the circular members 64 and 66, it is feasible to employ a staggered orientation between spoke portions 42, 44, 46, 48 of the left wheel half 16 and associated spoke portions 50, 52, 54, 56 of the right wheel half 18.

Referring to FIG. 2, the rim hoop 74 is configured to accept a conventional bicycle tire. In the preferred embodiment, the rim hoop 74 is extruded from aluminum or other lightweight metal, and is very similar to many conventional bicycle rims whose method of fabrication is well known in the industry. A portion of this aluminum rim hoop 74 is exposed on either side to provide a durable braking surface for use with bicycles with conventional caliper brakes. Fiber reinforced plastic would be a preferred rim hoop 74 material to reduce weight to an absolute minimum.

As illustrated in FIGS. 2 and 3 of the preferred embodiment, the left wheel half 16, the right wheel half 18 and the rim hoop 74 are fastened together with structural adhesive along three circular interfaces: the circular member interface 60, the left side rim hoop interface 68, and the right side rim hoop interface 70. It is important to recognize that the structural joints just described act to form an enclosed hollow structural annulus from three individual components: the left side circular member 64, the right side circular member 66, and the rim hoop 74. This structural annulus acts to support the rim hoop 74 and is capable of supporting the hoop stress due to the spoke tension as well as radial and axial loading due to the weight of the bicycle and rider.

Figure 6:
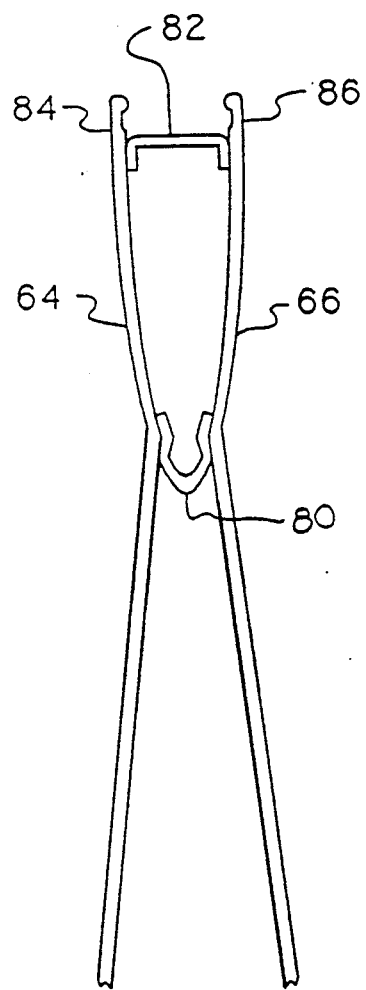
FIG. 6 is a cross-sectional view similar to that shown in FIG. 2 and illustrates an alternate embodiment configuration.
Figure 7:
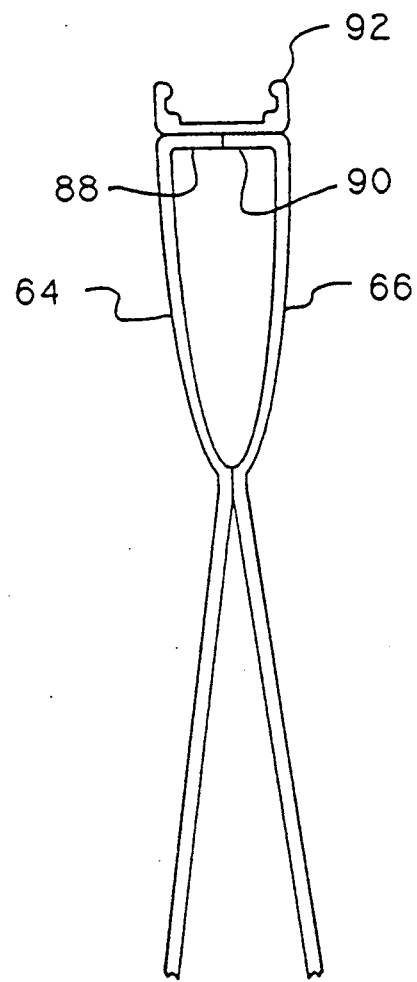
FIG. 7 is a cross-sectional view similar to that shown in FIG. 2 and illustrates a second alternate embodiment configuration.

FIGS. 6 and 7 illustrate some alternative embodiments pertaining to the rim supporting structural annulus of the bicycle wheel 14. As shown in FIG. 6, an inner rim hoop 80 is introduced to bridge the inner edge of the left side circular member 64 and the inner edge of the right side circular member 66. This inner rim hoop 80 would provide a separation element between the left wheel half spokes 42, 44, 46, 48 and their associated right wheel half spokes 50, 52, 54, 56. This would act to impart an increased lateral rigidity at the junction between the wheel half spokes 42, 44, 46, 48, 50, 52, 54, 56 and the circular members 64 and 66.

FIG. 6 also illustrates an alternative configuration where the actual rim hoop 74 is eliminated and the sidewalls of the rim hoop are incorporated into their respective circular members, resulting in tire flanges 84 and 86. An outer hoop 82 is employed to join the outer portions of the circular members 64 and 66 to create the desired hollow structural annulus mentioned previously.

FIG. 7 illustrates an additional alternative configuration where each circular member 64 and 66 employs turned in flanges 88 and 90 around its perimeter. An alternative rim hoop 92 is fastened to these flanges 88 and 90 in the manner illustrated. With this configuration, the desired structural annulus is maintained, however, the alternative rim hoop 92 could then be made to be removeable for servicing in the field.

Referring to FIGS. 2, 4 and 5, and especially the center region of the bicycle wheel 14, it should of course be appreciated that the outer portions of the wheel halves 16 and 18 and the rim hoop 74 have been structurally fastened together in the manner previously described. The left side hub ring 26 is then spread relative to the right side hub ring 28 through a predetermined axial distance and fixtured in place. This process acts to introduce tensile stress to the spokes 42, 44, 46, 48 and 50, 52, 54, 56. The hub shell 20 is then fitted through the central circular opening in the left spoke web 29 to a point where the right retainer groove 34 is exposed in the region between the hub rings 26 and 28. A split ring retainer 24 is then fitted to this retainer groove 34. Adhesive is now applied around the perimeter of the hub shell 20 in the regions that will engage with the hub rings 26 and 28 to fortify the hub ring 26 to hub shell 20 connection. The hub shell 20 is then further introduced through the spoke web 29 until it engages with the right side hub ring 28 and the exposed portion of the retainer 24 is seated against the edge of the hub ring 28. A second split ring type retainer 22 is then fitted to the unoccupied retainer groove 32 which is now exposed between the opposing hub rings 26 and 28. The fixture which holds the hub rings 26 and 28 in a spread apart relationship is removed and the spoke tension acts to bring these opposing hub rings 26 and 28 in firm contact against their respective retainers 22 and 24. The retainers 22 and 24 now serve to locate the hub rings 26 and 28 and thereby maintain tension in the spokes 42, 44, 46, 48, 50, 52, 54, 56.

It should be noted that an alternative embodiment could employ only a single retainer 24 which engages with an associated hub ring 28. The opposite hub ring 26 could be configured to engage with a contour formed within the hub shell 20 itself. Thus, at least one removeable retainer must be employed in engagement with the hub shell 20 to fix the opposing hub rings 26 and 28 in the manner previously described.

The preferred embodiment utilizes a split ring type retainer arrangement. However, it should be noted that any manner of pins or wedges could be substituted to facilitate engagement between the hub rings 26 and 28 and the hub shell 20 to achieve similar results.

It can be readily seen that the foregoing provides a bicycle wheel that yields improved performance while being simple and easy to manufacture. Significant advantages are obtained thereby. The present invention facilitates the construction of a bicycle wheel from parts that are simple and easy to manufacture and permits the construction of a bicycle wheel from relatively few component parts. Further, the present invention provides a bicycle wheel with improved aerodynamic efficiency and provides a bicycle wheel that is particularly light weight for improved responsiveness. In addition, the present invention provides a bicycle wheel that is stable and safe in all normal wind conditions and provides a bicycle wheel that does not require periodic rim alignment or truing and also provides a bicycle wheel that is resilient for greater rider comfort.

Although the description above contains many specificities, these should not be construed as limiting the scope of the invention, but merely providing illustrations of some of the presently preferred embodiments of this invention. Thus the scope of the invention should be determined by the appended claims and their legal equivalents rather than by the examples given.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A spoked wheel comprising: an annular rim; a central hub; a plurality of spoke portions running between the rim and hub; and wherein said wheel comprises at least two wheel portions integrally joined to each other and including said spoke portions, means adjacent said hub for retaining the hub between the wheel portions, wherein said spoke portions extend radially outwardly between the rim and hub to an outside circular member, said circular member defining an enclosed, continuous, circumferential hollow annulus for supporting hoop stress, said circular member retaining the annular rim outwardly of said wheel portions, and wherein said wheel portions are fastened together adjacent said circular member.

2. Wheel according to claim 1 wherein the wheel portions are symmetrically opposed to each other.

3. Wheel according to claim 2 including two wheel portions each having an inside portion connected to the hub and an outside portion connected to the rim.

4. Wheel according to claim 3 wherein each wheel portion comprises a single, contiguous piece and both wheel portions are symmetrical.

5. Wheel according to claim 3 wherein the inside portion of each wheel portion includes a centrally located spoke web and flange-like hub ring connected thereto, and wherein said hub ring is connected to the central hub.

6. Wheel according to claim 5 wherein said spokes of each wheel portion extend radially from the spoke web to said outside circular member.

7. Wheel according to claim 6 including at least one retainer means between the hub and hub ring to axially locate and fixture the hub ring to the hub.

8. Wheel according to claim 6 wherein said circular member is formed from both wheel portions and has a base portion comprising fastened together sections of both wheel portions and wherein said circular member flares in a generally divergent outward direction.

9. Wheel according to claim 8 wherein said rim is connected to the outwardly flaring circular member of both wheel portions.

10. Wheel according to claim 9 including means in the rim to accept a tire valve.

11. Wheel according to claim 9 wherein said annular rim is formed by a rim member and said wheel portions.

12. Wheel according to claim 8 including an inner rim hoop forming the base portion of the circular member and bridging both wheel portions.

13. Wheel according to claim 3 wherein said wheel portions are molded from high-strength, fiber reinforced plastic.

14. Wheel according to claim 3 wherein each wheel portion includes three to five spoke portions.

15. Wheel according to claim 1 wherein said wheel is a bicycle wheel.

16. Wheel according to claim 1 wherein said circular member is formed by at least two members joined together, and wherein said rim is affixed to said joined together members.

17. Wheel according to claim 16 wherein said circular member is formed by said wheel portions and said annular rim.

* * * * *